(12) United States Patent (10) Patent No.: US 12,661,213 B2
Zhang (45) Date of Patent: Jun. 23, 2026

(54) MULTIFUNCTIONAL PORTABLE TOOL AND PERSONAL CARE APPARATUS

(71) Applicant: Shen Zhen Shi Ti Zi Shu Ju You Xian Gong Si, Shenzhen (CN)

(72) Inventor: Mi Zhang, Shenzhen (CN)

(73) Assignee: Shenzhen TiziData Co., Ltd, Shenzhen (CN)

( * ) Notice: Subject to any disclaimer, the term of this patent is extended or adjusted under 35 U.S.C. 154(b) by 419 days.

(21) Appl. No.: 18/385,399

(22) Filed: Oct. 31, 2023

(65) Prior Publication Data

US 2024/0074840 A1 Mar. 7, 2024

(30) Foreign Application Priority Data

Sep. 3, 2022 (CN) .......................... 202211075159.0

(51) Int. Cl.
| | |
|---|---|
| *A61C 17/02* | (2006.01) |
| *A45D 27/22* | (2006.01) |
| *A45D 29/04* | (2006.01) |
| *A61H 35/04* | (2006.01) |
| *B25F 1/00* | (2006.01) |
| *F04B 53/22* | (2006.01) |
| *F04B 43/04* | (2006.01) |
| *F04B 53/16* | (2006.01) |
| *F04D 19/00* | (2006.01) |

(52) U.S. Cl.
CPC .......... *A61C 17/0202* (2013.01); *A45D 27/22* (2013.01); *A45D 29/04* (2013.01); *A61H 35/04* (2013.01); *B25F 1/00* (2013.01); *F04B 53/22* (2013.01); *A61H 2205/023* (2013.01); *F04B 43/04* (2013.01); *F04B 53/16* (2013.01); *F04D 19/002* (2013.01)

(58) Field of Classification Search
CPC ...... B25F 1/00; B25F 1/02; B25F 1/04; F04B 53/22; F04B 23/025; F04B 23/028; F04B 23/106; F04B 23/12; F04B 23/14; F04B 17/03; F04B 43/04; F04B 53/16; A45D 27/22; A45D 29/04; A61C 17/0202; A61H 2205/023; A61H 35/04; F04D 19/002
See application file for complete search history.

(56) References Cited

U.S. PATENT DOCUMENTS 5,634,791 A * 6/1997 Matsuura ........... A61C 17/0202
433/88
6,499,962 B1 * 12/2002 Keiner .................... F04B 53/22
417/470
2022/0151753 A1 * 5/2022 Zhou .................. A61C 17/0205

FOREIGN PATENT DOCUMENTS

CH 663148 A5 * 11/1987 ............. A45D 29/14
JP 11276377 A * 10/1999

* cited by examiner

*Primary Examiner* — Charles G Freay
*Assistant Examiner* — Joseph S. Herrmann

(57) ABSTRACT

A multifunctional portable tool is provided, which includes a housing; a motor received in the housing and having a first output end; a pump head movably received in the housing and having a driven shaft that is connectable with the first output end; and a first reset mechanism disposed between the motor and the pump head. The multifunctional portable tool has a first working state in which the driven shaft of the pump head is connected with the first output end of the motor so that the pump head and the motor together function as a pump, and a second working state in which the pump head is driven by the first reset mechanism to move away from the motor until the driven shaft of the pump head is disconnected with the first output end of the motor.

20 Claims, 8 Drawing Sheets

MULTIFUNCTIONAL PORTABLE TOOL AND PERSONAL CARE APPARATUS

CROSS-REFERENCE TO RELATED APPLICATIONS

This application claims priority of Chinese Patent Application No. 202211075159.0, filed on Sep. 3, 2022, the entire contents of which are hereby incorporated by reference.

TECHNICAL FIELD

This application relates to a multifunctional portable tool, especially to a multifunctional portable tool including a motor and a pump head that are connectable and disconnectable with each other, and a personal care apparatus including such multifunctional portable tool.

DESCRIPTION OF THE PRIOR ART

People use many personal care apparatuses in life, such as electric toothbrushes, electric razors, nail grinders, nose hair trimmers, hand-held fans and the like which are simply driven by motors, night lights and the like which are lighted by a battery, and water flossers, nasal irrigators, portable intelligence toilets and the like which use motors to drive pump heads to pump water. However, such personal care apparatuses usually have the following shortcomings: simple function, and requiring various apparatuses to achieve different functions; high cost, as each apparatus is purchased independently; not portable, and various apparatuses occupying large space, especially when traveling; accompanying with chaotic charging lines, as various apparatuses may require multiple different types of charging lines and different charging methods, which may require additional sockets and adapters; not environmentally friendly, as each apparatus includes a battery, a motor and a PCBA, with low utilization rate; and non-extensible, with each apparatus having a single function with a fixed plug (such as a toothbrush head, a razor head, a nail grinder head, a nose hair trimmer head, a fan head, or a light head) which cannot be replaced by other plugs.

SUMMARY OF THE DISCLOSURE

In view of the above, the present invention provides a multifunctional portable tool and a personal care apparatus to solve or at least alleviate the above problems.

In one aspect, the present invention provides multifunctional portable tool, which includes a housing having a first connection end and an opposing second connection end; a motor received in the housing, the motor having a first output end and a second output end; a pump head movably received in the housing, the pump head having a driven shaft that is connectable with the first output end; and a first reset mechanism disposed between the motor and the pump head. The multifunctional portable tool includes a first working state in which the driven shaft of the pump head is connected with the first output end of the motor so that the pump head and the motor together function as a pump, and a second working state in which the pump head is driven by the first reset mechanism to move away from the motor until the driven shaft of the pump head is disconnected with the first output end of the motor.

In another aspect, the present invention provides a personal care apparatus, which includes the above multifunctional portable tool.

The multifunctional portable tool of the present invention has at least the following benefits: when the user just wants to use the motor of the multifunctional portable tool, he/she can connect the plug (such as a toothbrush head) of the personal care apparatus to the second connection end of the multifunctional portable tool and use the motor of the multifunctional portable tool to drive the plug of the personal care apparatus to work; when the user wants to use the multifunctional portable tool as a pump, he/she can connect the plug (such as an outlet pipe for a water flosser) of the personal care apparatus to the first connection end of the multifunctional portable tool and connect a water source to the second connection end of the multifunctional portable tool to use the motor of the multifunctional portable tool to drive the pump head to pump water. Therefore, the portable tool of the present invention can be applied in various personal care apparatuses and thus has multiple functions, which reduces the cost, requires a single charging line, is environmentally friendly, and extensible (various plugs can be connected with the portable tool).

BRIEF DESCRIPTION OF DRAWINGS

In order to clearly illustrate the embodiments of the present invention, a brief description will be made below to the drawings accompanying the embodiments of the invention. Obviously, the drawings below only show some embodiments of the invention and the skilled person in the art can obtain other drawings based on these drawings without creative work.

DESCRIPTION OF EMBODIMENTS

The technical solutions according to the embodiments of the present application will be described in combination with the drawings according to the embodiments of the present application. The described embodiments represent some but not all the possible embodiments. Based on the embodiments in this application, all other embodiments obtained by the skilled person in the art without creative efforts fall in the protection scope of this application.

It should be noted that, when a component is "connected" with another component, it may be directly connected to another component or may be indirectly connected to another component through a further component. When a component is "provided" on another component, it may be directly provided on another component or may be provided on another component through a further component.

Unless otherwise defined, all technical and scientific terms used herein have the same meaning as commonly understood by the skilled person in the art. The terms in the description of the present application are used to describe specific embodiments, and not to limit the present application. The term "and/or" used herein includes any combinations of one or more of the listed options, as well as the combination of all of the listed options.

In the present application, the terms "first", "second" and so on are only used for descriptive purposes, and should not be understood as indicating or implying the relative importance or implicitly indicating the quantity and order of the indicated technical features. Thus, a feature defined with "first" and "second" may explicitly or implicitly includes one or more of such features. In the description of the present application, "plurality" means at least two, such as two, three, etc., unless otherwise specifically defined.

Figure 1:
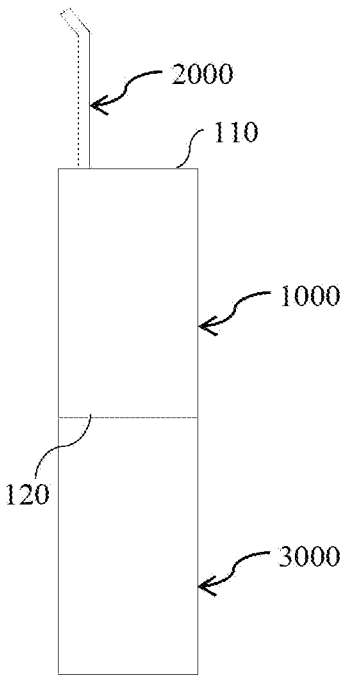
FIG. 1 is a simplified schematic diagram of a personal care apparatus according to an embodiment of the present invention.

Referring to FIG. 1, a personal care apparatus according to an embodiment of the present invention includes a multifunctional portable tool 1000 having a first connection end 110 and an opposing second connection end 120, an outlet pipe 2000 detachably connected to the first connection end 110 of the multifunctional portable tool 1000, and a water source 3000 detachably connected to the second connection end 120 of the multifunctional portable tool 1000. As an example, the personal care apparatus in this embodiment is a water flosser. In other embodiments, the personal care apparatus may be, but not limited to, a nasal irrigator or a portable intelligence toilet.

Figure 2:
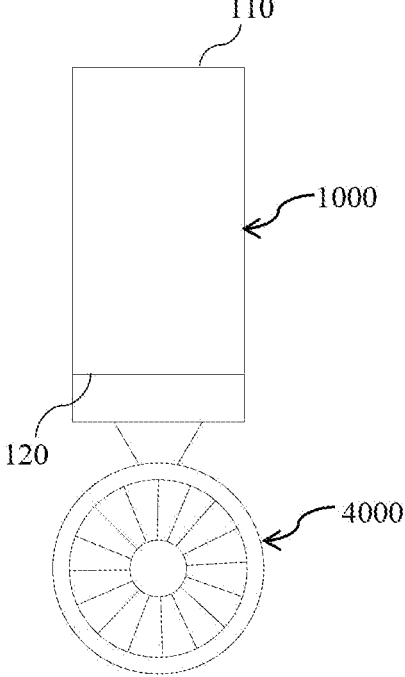
FIG. 2 is a simplified schematic diagram of a personal care apparatus according to another embodiment of the present invention.
Figure 3:
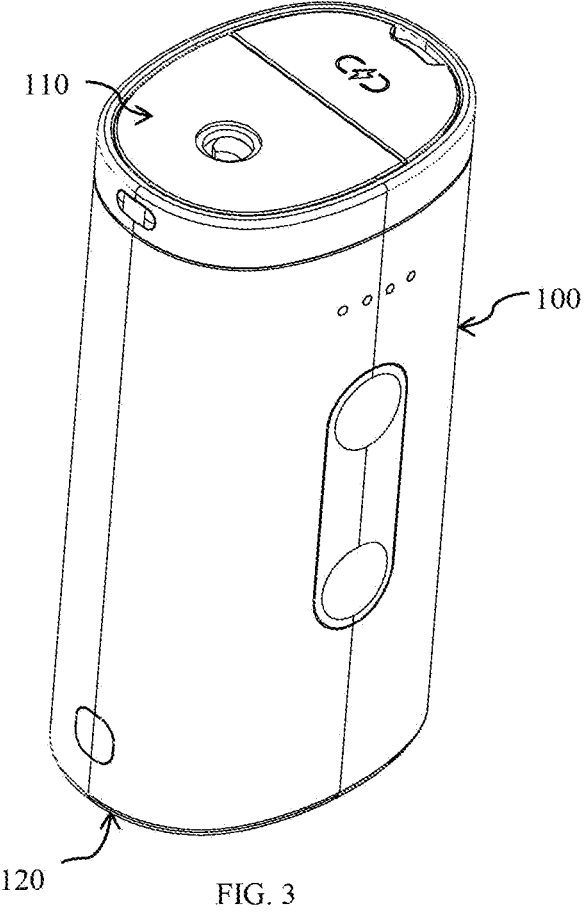
FIG. 3 is a perspective view of a multifunctional portable tool according to an embodiment of the present invention.

Alternatively, the multifunctional portable tool 1000 may be applied to, but not limited to, an electric toothbrush, an electric razor, a nail grinder, a nose hair trimmer, a hand-held fan, or a night light, and in such case, the outlet pipe 2000 can be removed, and the water source 3000 is replaced by a plug, such as a toothbrush head, a razor head, a nail grinder head, a nose hair trimmer head, a fan head, or a light head. For example, as shown in FIG. 2, a personal care apparatus according to another embodiment includes the multifunctional portable tool 1000 and a fan head 4000 connected to the second connection end 120 of the multifunctional portable tool 1000.

Referring to FIGS. 3 to 6, the multifunctional portable tool 1000 includes a housing 100, a holder 200, a motor 300, a pump head 400, an inlet pipe 500, and a control component 600.

The housing 100 is generally shaped as an elliptical cylinder and has a chamber therein (not shown). The first connection end 110 and the second connection end 120 are respectively provided at the two axial ends of the housing 100. Preferably, the housing 100 is sized such that it can be held by a single hand of people.

The holder 200 is also generally shaped as an elliptical cylinder and received in the chamber of the housing 100. The holder 200 includes a first accommodation portion 210 having a first chamber 211 for accommodating the motor 300 and the pump head 400, a second accommodation portion 220 having a second chamber (not shown) for accommodating the inlet pipe 500, and a third accommodation portion 230 having a third chamber (not shown) for accommodating part of the control component 600.

The motor 300 is fixed within the bottom of the first chamber 211 of the holder 200 and has a first output end 310 and an opposing second output end 320. In this embodiment, the first output end 310 and the second output end 320 are both configured as shafts.

The pump head 400 is slidably received within the top of the first chamber 211 of the holder 200 and has an inlet hole 410 and an opposing outlet hole 420. The inlet hole 410 is connected and communicated with one end of the inlet pipe 500, the other end of which is communicated with the second connection end 120. The outlet hole 420 in this embodiment is located at the center of the top side of the pump head 400. Further, the pump head 400 includes a driven shaft 430 located at the bottom of the pump head 400 for connecting with the first output end 310 of the motor 300. The pump head 400 can be configured as an existing diaphragm pump head, which will not be described in detail. Specially, a first reset mechanism 700 is disposed between the motor 300 and the pump head 400, which, in this embodiment, is a spring and will be further described in detail below regarding its function.

The control component 600 includes a PCB board 610, a battery 620, and a control button 630. The PCB board 610 is electrically connected with the motor 300. Preferably, the PCB board 610 is disposed on an outer side 240 of the holder 200 to save space. The battery 620 is accommodated in the third chamber of the third accommodation portion 230 of the holder 200 and electrically connected with the PCB board 610. The control button 630 is disposed on an outer side 130 of the housing 100 and electrically connected with the PCB board 610.

Optionally, the control component 600 may further includes a USB interface 640 that is accommodated in the holder 200 and electrically connected with the PCB board 610, so that the battery 620 can be charged repeatedly.

Preferably, the control component 600 may further include hall sensors 650 (see FIG. 9) that are electrically connected with the PCB board 610. The hall sensors 650 can be used to detect magnets disposed in the plug such as the fan head 4000 of the personal care apparatus and determine which operation mode the motor 300 would work in, specifically, to determine the power (which affects the rotation speed) and/or the rotation direction of the motor 300. For example, if the hall sensors 650 detect that a fan head is connected to the second connection end 120 of the multifunctional portable tool 1000, the motor 300 would work at a relatively high power. If the hall sensors 650 detect that a toothbrush head is connected to the second connection end 120 of the multifunctional portable tool 1000, the motor 300 would work at a relatively low power.

As mentioned above, the multifunctional portable tool 1000 can be connected with the outlet pipe 2000 at the first connection end 110 thereof and connected with the water source 3000 at the second connection end 120. Specifically, the outlet pipe 2000 can be inserted through the first connection end 110 to communicate with the outlet hole 420 of the pump head 400 and move the pump head 400 towards the motor 300 so that the driven shaft 430 of the pump head 400 can be connected with the first output end 310 of the motor 300, in which case the first reset mechanism 700, i.e., the spring, is compressed. In this first working state of the multifunctional portable tool 1000, the pump head 400 is connected with the motor 300, and thus the pump head 400 and the motor 300 together function as a pump. Therefore, the water from the water source 3000 connected with the second connection end 120 can be pumped via the inlet pipe 500 communicated with the second connection end 120, the inlet hole 410 communicated with the inlet pipe 500 and the outlet hole 420 of the pump head 400 communicated with inlet hole 410 and finally out from the outlet pipe 2000 communicated with the outlet hole 420.

Alternatively, as mentioned above, the multifunctional portable tool 1000 can be connected with the plug such as the fan head 4000 of the personal care apparatus at the second connection end 120, in which case, the outlet pipe 2000 is removed and the pump head 400 is driven by the first reset mechanism 700 (as the spring tends to resiliently return to its natural shape) to move away from the motor 300 until the driven shaft 430 of the pump head 400 is disconnected with the first output end 310 of the motor 300. In this second working state of the multifunctional portable tool 1000, the plug such as the fan head 4000 of the personal care apparatus is connected, directly or indirectly, with the second output end 320 of the motor 300. Therefore, the plug such as the fan head 4000 of the personal care apparatus can be driven by the motor 300 to work. Meanwhile, in this second working state, as the pump head 400 is disconnected with the motor 300 and out of work, the efficiency of the motor 300 is improved, the noise of the multifunctional portable tool 1000 is greatly reduced and the working life of the pump head 400 can be prolonged.

Figure 6:
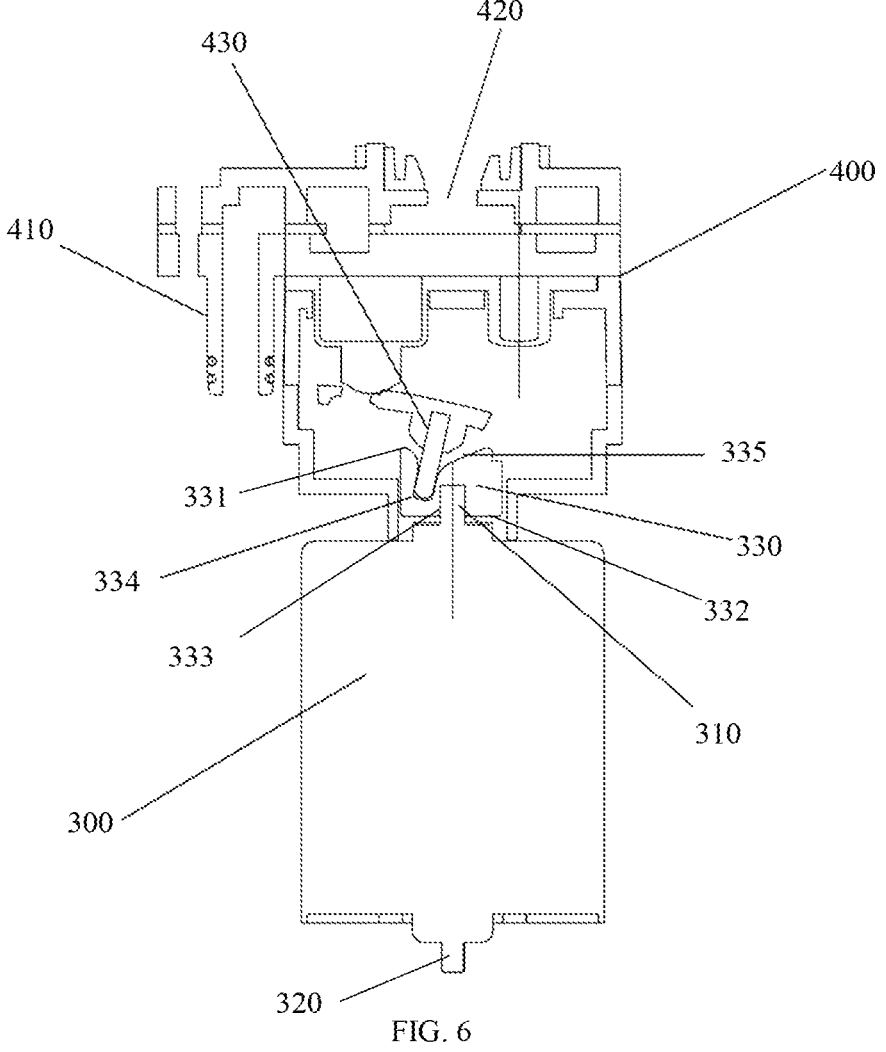
FIG. 6 is a partial cross-sectional view of the multifunctional portable tool shown in FIG. 3.

In particular, the multifunctional portable tool 1000 further includes a first connector 330 connected with the first output end 310 of the motor 300. Specifically, the first connector 330 is generally columnar and has a top end surface 331 and an opposing bottom end surface 332 as shown in FIG. 6. The first connector 330 has a central hole 333 that is recessed from the bottom end surface 332 of the first connector 330, and an eccentric hole 334 that is recessed from the top end surface 331 of the first connector 330. The first output end 310 of the motor 300 is inserted into and fixedly connected with the central hole 333 of the first connector 330. The driven shaft 430 of the pump head 400 driven by the outlet pipe 2000 under an external force (for example, a press force from the user on the outlet pipe 2000) is inserted into and connected with the eccentric hole 334 of the first connector 330 in said first working state of the multifunctional portable tool 1000 so that the motor 300 can drive the pump head 400 to pump water.

Preferably, the first connector 330 further includes a first slope 335 that extends from the top end surface 331 into the eccentric hole 334, and the driven shaft 430 of the pump head 400 is configured to move from the center of the top end surface 331 of the first connector 330 over the slope 335 into the eccentric hole 334. Therefore, no matter where the eccentric hole 334 of the first connector 330 is circumferentially located after the previous use, the driven shaft 430 of the pump head 400 can be accurately inserted into the eccentric hole 334 of the first connector 330 in the next use. Preferably, the first slope 335 is shaped as a tapered recess to facilitate the movement of the driven shaft 430 of the pump head 400.

Figure 7:
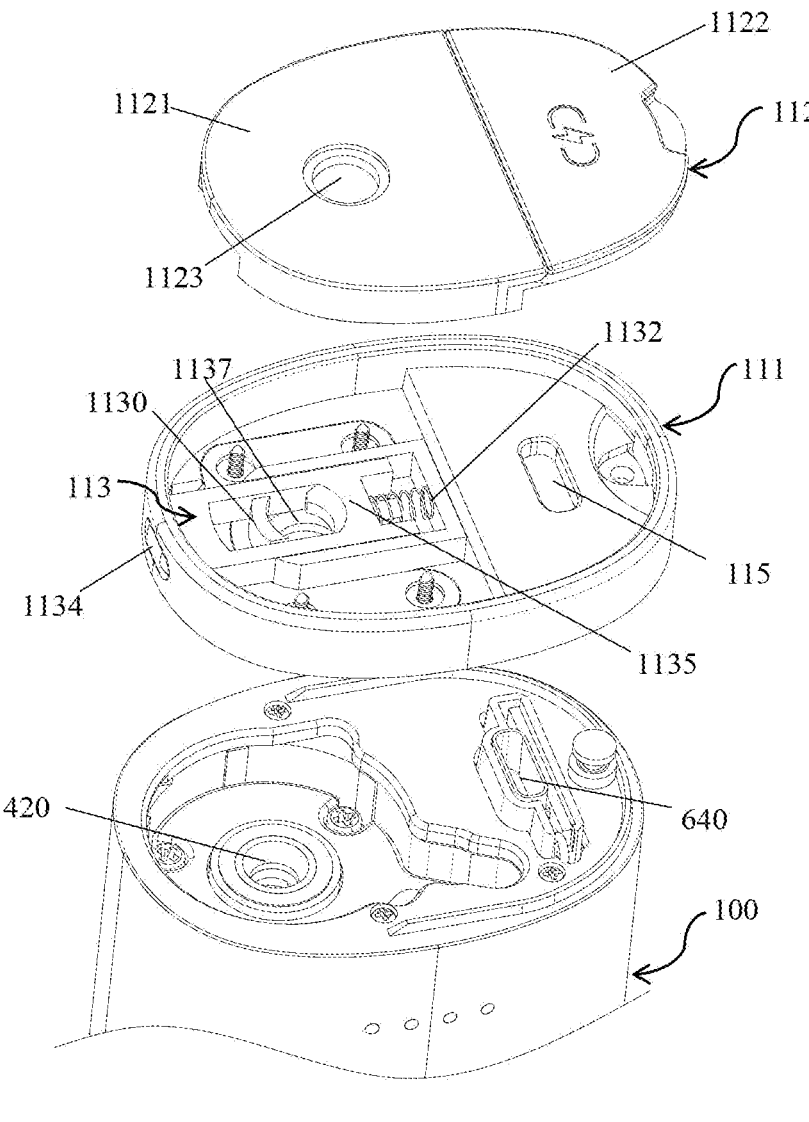
FIG. 7 is an explosion view showing a first connection end of the multifunctional portable tool as shown in FIG. 3.
Figure 8:
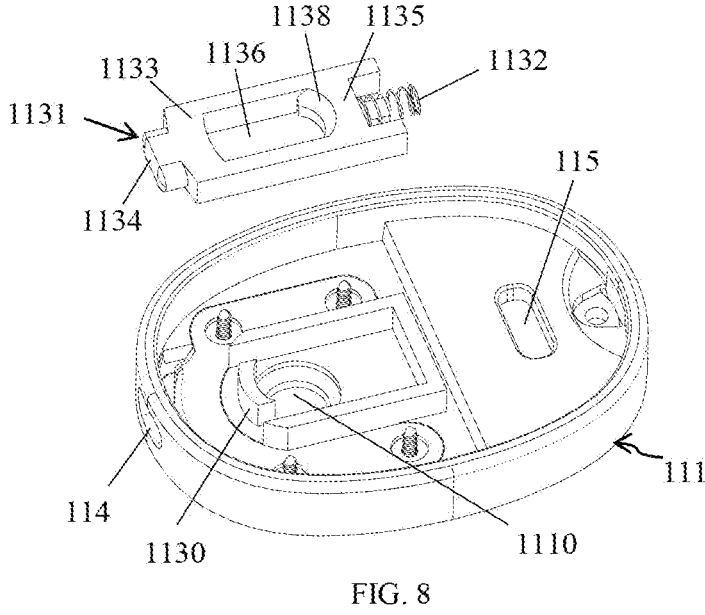
FIG. 8 is an explosion view of a base of the first connection end shown in FIG. 7.

Referring to FIGS. 7-8, the first connection end 110 at one axial end of the housing 100 includes a base 111 and a first end cap 112 connecting and covering the base 111. The base 111 includes a clamp mechanism 113 for clamping the outlet pipe 2000 so that the driven shaft 430 of the pump head 400 can be connected with the eccentric hole 334 of the first connector 330 all the time in the first working state.

Specifically, the clamp mechanism 113 includes a fixed portion 1130, a movable button 1131, and a spring 1132. The fixed portion 1130 is configured as a first block protruding from the base 111. The movable button 1131 is slidably connected with the base 111 and includes a U-shaped body 1133, a press portion 1134 provided at the bottom of the U-shaped body 1133, and a second block 1135 provided between the two arms of the U-shaped body 1133. The fixed portion 1130 is received within a first receiving hole 1136 defined by the U-shaped body 1133 and the second block 1135. Further, the fixed portion 1130 and the second block 1135 define a through hole 1137 for receiving the outlet pipe 2000 and communicated with the outlet hole 420 of the pump head 400 via another through hole 1110 defined in the base 111. The spring 1132 is connected between the second block 1135 and the base 111.

Further, the base 111 has a second receiving hole 114 for receiving the press portion 1134 of the movable button 1131 and a third receiving hole 115 for receiving the USB interface 640.

The first end cap 112 includes a first portion 1121 that is fixed with the base 111 and covers the portion of the base 111 corresponding to the clamp mechanism 113, and a second portion 1122 that is hinged with the first portion 1121 for covering the other portion of the base 111 corresponding to the third receiving hole 115.

The first portion 1121 of the first end cap 112 has an insertion hole 1123 that is aligned with the through hole 1137. When the user inserts the outlet pipe 2000, the outlet pipe 2000 passes through the insertion hole 1123 of the first end cap 112, the through holes 1137, 1110 of the base 111 and the outlet hole 420 of the pump head 400 to move the pump head 400 towards the motor 300. When the driven shaft 430 of the pump head 400 is connected with the first output end 310 of the motor 300, the outlet pipe 2000 cannot move downward anymore and the fixed portion 1130 and the second block 1135 under the action of the spring 1132 clamp the outlet pipe 2000 to keep the connection, in which state, the outlet pipe 2000 is also communicated with the outlet hole 420 of the pump head 400.

When the user wants to remove the outlet pipe 2000, he/she only needs to press the press portion 1134 of the movable button 1131 so that the second block 1135 of the movable button 1131 moves away from the fixed portion 1130 and thus the through hole 1137 is enlarged and the outlet pipe 2000 can be then pulled out.

Preferably, the second block 1135 of the movable button 1131 has a second slope 1138, and the outlet pipe 2000 is configured to move over the second slope 1138 under the external force (i.e., the press force from the user) into the through hole 1137. Therefore, when the outlet pipe 2000 moves over the second slope 1138, the movable button 1131 will be pushed by the outlet pipe 2000 to press the spring 1132. After the driven shaft 430 of the pump head 400 is connected with the first output end 310 of the motor 300, the spring 1132 will resiliently push the movable button 1131 back so that the second block 1135 of the movable button 1131 and the fixed portion 1130 can clamp and fix the outlet pipe 2000 so as to keep the connection of the driven shaft 430 of the pump head 400 and the first output end 310 of the motor 300. In this embodiment, the second slope 1138 is arc-shaped.

Figure 9:
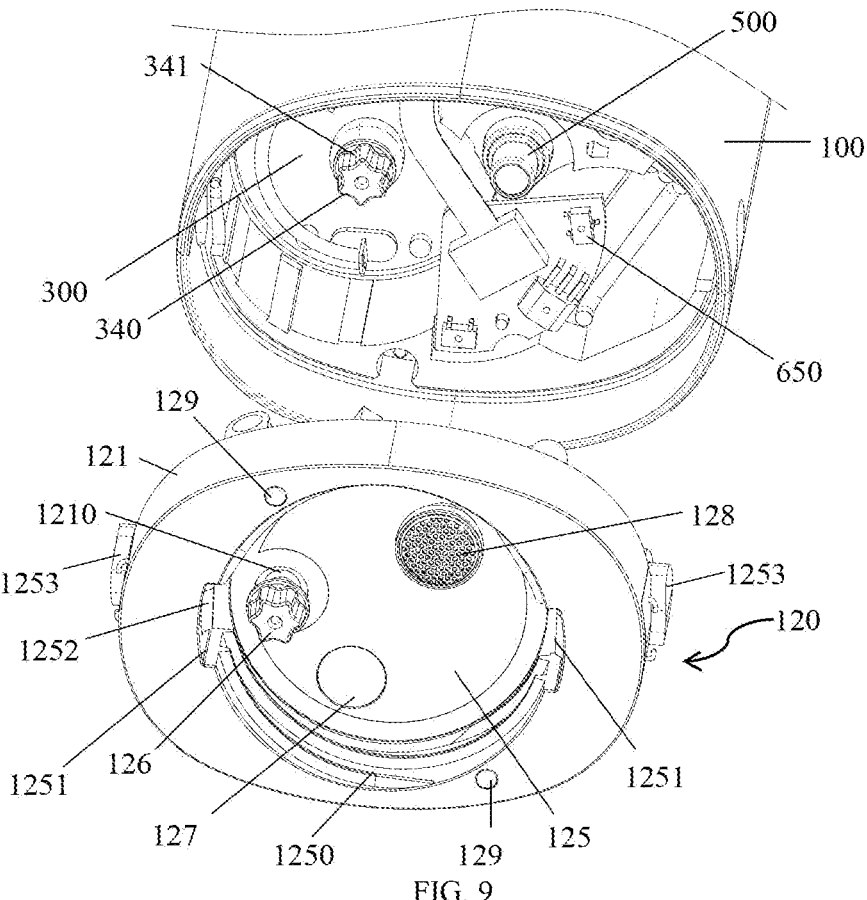
FIG. 9 is an explosion view showing a second connection end of the multifunctional portable tool as shown in FIG. 3.
Figure 10:
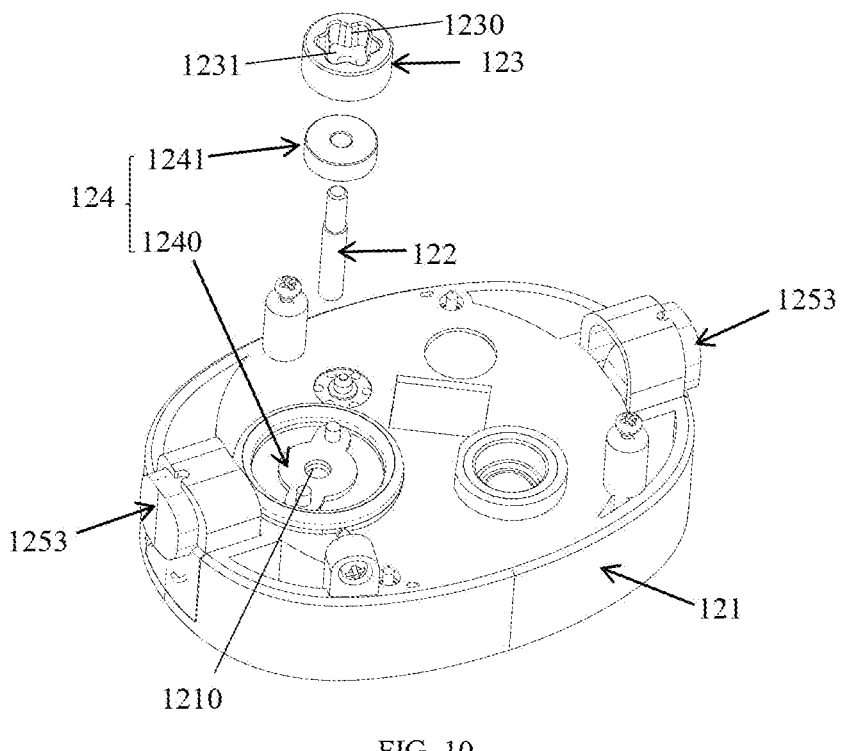
FIG. 10 is an explosion view of the second connection end shown in FIG. 9.

Referring to FIGS. 9-10, the second connection end 120 at the other axial end of the housing 100 includes a second end cap 121. An output shaft 122 is inserted into and movably connected with the second end cap 121 for connecting the second output end 320 of the motor 300 and the plug such as the fan head 4000 of the personal care apparatus in the second working state. However, in the first working state, the output shaft 122 is disconnected with the second output end 320 of the motor 300. Therefore, in the first working state, the output shaft 122 is stationary and the noise of the multifunctional portable tool 1000 can be reduced and the working life of the output shaft 122 can be prolonged.

Specifically, the second output end 320 of the motor 300 is connected with a second connector 340, and the output shaft 122 is connected with a third connector 123. In the first working state, the second connector 340 is disconnected with the third connector 123, and in the second working state, the second connector 340 is connected with the third connector 123.

More specifically, the second connector 340 has a non-circular outer surface 341, such as a polygonal outer surface as shown in FIG. 9, and the third connector 123 has a non-circular inner surface 1230, such as a polygonal inner surface as shown in FIG. 10. In this embodiment, the third connector 123 is configured as a shaft sleeve fixedly surrounding the output shaft 122 and has a receiving groove 1231 which is defined by the non-circular inner surface 1230. In the second working state, the second connector 340 is received in the receiving groove 1231 of the third connector 123, and the non-circular outer surface 341 and the non-circular inner surface 1230 engages with each other in a form fit so that the output shaft 122 will rotate together with the second output end 320 of the motor 300. It would be appreciated that the output shaft 122 can be connected with the second output end 320 of the motor 300 through other mechanisms, such as a coupling, which would not be described in detail here.

In this embodiment, in order to automatically disconnecting the output shaft 122 with the second output end 320 of the motor 300 after the plug such as the fan head 4000 of the personal care apparatus is removed, for example in the first working state, a second reset mechanism 124 is provided, preferably, the second reset mechanism 124 is a magnetic reset mechanism.

Specifically, the second reset mechanism 124 includes an iron sheet 1240 fixed with the second end cap 121 and a magnetic ring 1241 fixed with the output shaft 122 and facing the iron sheet 1240. In the second working state, the output shaft 122 is driven by the plug such as the fan head 4000 of the personal care apparatus to connect with the second output end 320 of the motor 300, in which state, the magnetic ring 1241 is separated from the iron sheet 1240. After the plug such as the fan head 4000 of the personal care apparatus is removed, the output shaft 122 would not be pressed any more, for example, in the first working state, the iron sheet 1240 would absorb the magnetic ring 1241 to move towards the iron sheet 1240 and thus the output shaft 122 with the third connector 123 will move together with the magnetic ring 1241 until the magnetic ring 1241 contacts and connects the iron sheet 1240, thereby disconnecting the third connector 123 with the second output end 320 of the motor 300.

Figure 4:
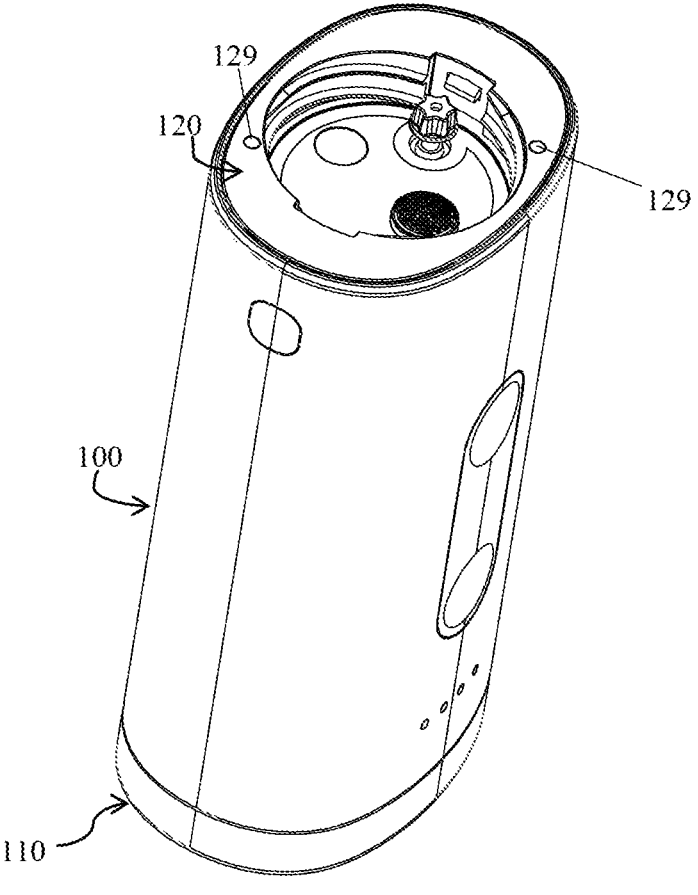
FIG. 4 is another perspective view of the multifunctional portable tool shown in FIG. 3.
Figure 5:
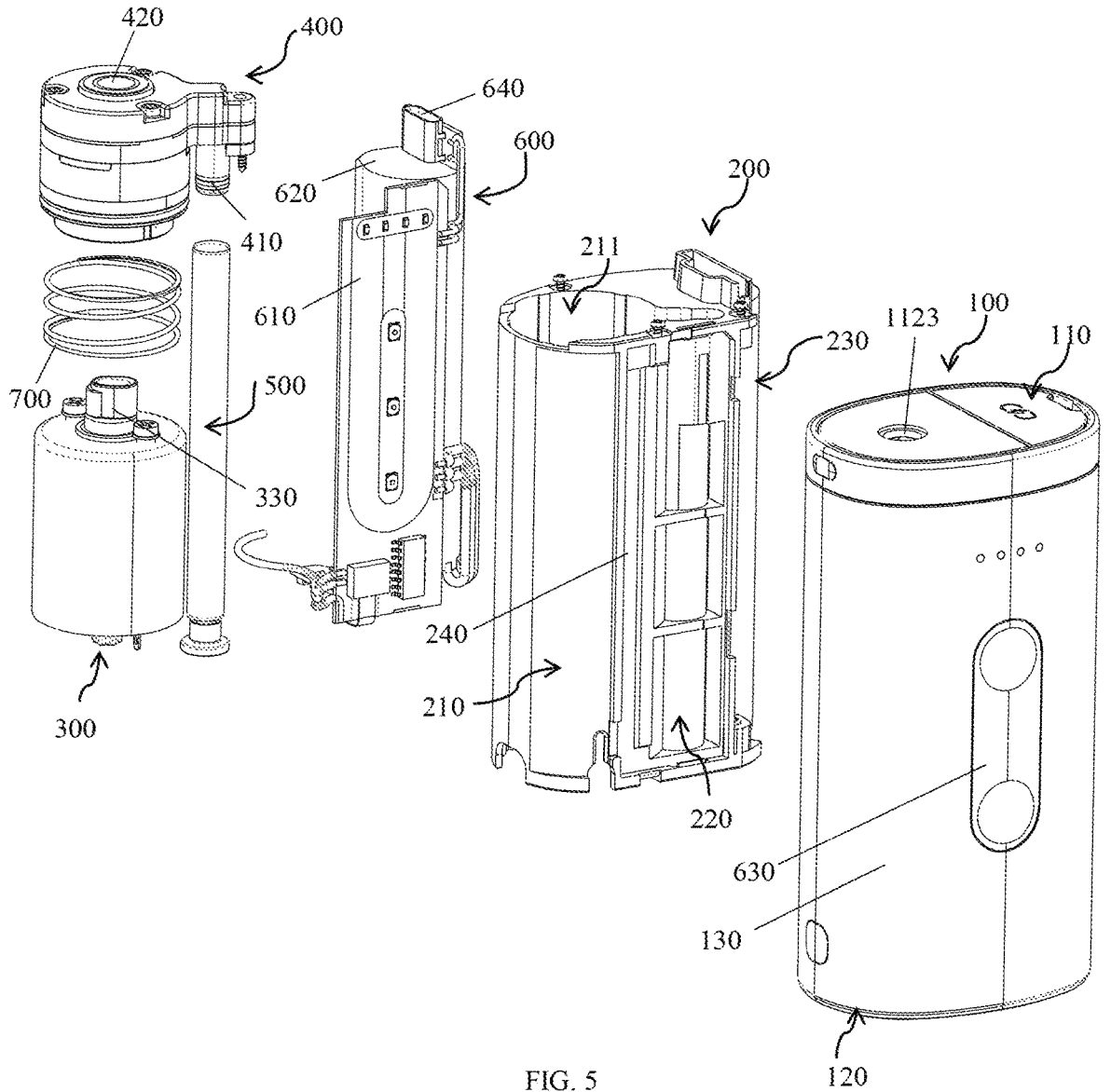
FIG. 5 is an explosion view of the multifunctional portable tool shown in FIG. 3.

More preferably, the multifunctional portable tool further has a third working state, in which the driven shaft 430 of the pump head 400 is disconnected with the first output end 310 of the motor 300 and the output shaft 122 is disconnected with the second output end 320 of the motor 300. That is, in this third working state, the motor 300 does not work anymore. Further, as shown in FIGS. 4 and 9, the second connection end 120 further includes two electrical interfaces 129 electrically connecting with the battery 620. In this third working state, the plug such as the light head of the personal care apparatus can be connected to the second connection end 120 and electrically connected with the electrical interfaces 129, so that the light head can be lighted by the battery 620. It can be seen that, in this third working state, the portable tool is used as a power supply.

For convenience of connection of the plug, in this embodiment, the second end cap 121 has a recessed chamber 125 for receiving the plug such as the fan head 4000 or the water source 3000 of the personal care apparatus.

Specifically, the recessed chamber 125 has a female thread 1250 on its wall, and the other part such as the water source 3000 of the personal care apparatus has a male thread (not shown) for engaging with the female thread 1250 of the recessed chamber 125. More preferably, the recessed chamber 125 is sized to fit the mouth size of a standard water bottle, such as a mouth size of 28 mm, and therefore, the user can conveniently access water.

Further, the wall of the recessed chamber 125 has two opposing recessed grooves 1251 communicating with the recessed chamber 125, and two opposing snaps 1252 received within the respective recessed grooves 1251 and connected with respective resilient press buttons 1253. The plug such as the fan head 4000 of the personal care apparatus can be inserted into the recessed chamber 125 and engaged with the snaps 1252 so as to connect the second connection end 120 of the housing 100, in which state, the plug such as the fan head 4000 of the personal care apparatus connects the output shaft 122 and presses the output shaft 122 to connect with the second output end 320 of the motor 300 so as to rotate with the output shaft 122. When the user wants to remove the plug such as the fan head 4000 of the personal care apparatus, he/she can press the two press buttons 1253 simultaneously to release the connection of the snaps 1252 with the plug such as the fan head 4000 of the personal care apparatus.

Optionally, a fourth connector 126 having a non-circular outer surface, similar to the second connector 340, can be fixed with the end of the output shaft 122 passing through an axially-through hole 1210 (FIG. 10) of the second end cap 121 and protruding into the recessed chamber 125, and the plug such as the fan head 4000 of the personal care apparatus connects the fourth connector 126 so that the plug such as the fan head 4000 of the personal care apparatus can be driven by the output shaft 122 to work. Preferably, a rubber sealing element (not shown) can be provided in the axially-through hole 1210 and between the iron sheet 1240 and the second end cap 121 to prevent water leakage into the interior of the housing 100 in the first working state. Especially, in the first working state, as stated above, the iron sheet 1240 absorbs the magnetic ring 1241 and the output shaft 122 is disconnected with the second output end 320 of the motor 300, so that the output shaft 122 and the fourth connector 126 would not rotate to wear the rubber sealing element, lengthening the span of life of the rubber sealing element and improving the leakage-preventing effect.

Optionally, a one-way valve 127 can be provided at the second end cap 121 in the recessed chamber 125. The one-way valve 127 functions to prevent water in the recessed chamber 125 from flowing into the interior of the housing 100, and to allow air in the interior of the housing 100 to flow into the recessed chamber 125 to equalize the pressure in the bottle of water source 3000 in the first working state. For example, the one-way valve 127 can choose a known duckbill valve. Further, a filter 128 can be provided at the second end cap 121 in the recessed chamber 125 and communicated with one end of the inlet pipe 500 for filtering impurities and particles in the water.

The features described in the above various embodiments may be combined. In order to simplify the descriptions, not all possible combinations of the features in the above embodiments have been described. However, any combinations of the features should be within the scope of the invention as long as no conflict resides between these features. In the case where the features in different embodiments are shown in the same drawing, it may be considered that this drawing discloses a combination of the various embodiments involved.

The above embodiments are only several implementations of the present invention which are described specifically and in detail, without limitation to the scope claimed by the present invention. Those skilled in the art can make various modifications and variations to the embodiments without departing from the spirit and scope of the present invention, and these modifications and variations should fall into the scope claimed by the present invention. Therefore, the scope of protection of the invention patent should be subject to the attached claims.

The invention claimed is:

1. A multifunctional portable tool, comprising:
a housing having a first connection end and an opposing second connection end;
a motor received in the housing, the motor having a first output end and a second output end;
a pump head movably received in the housing, the pump head having a driven shaft that is connectable with the first output end; and
a first reset mechanism disposed between the motor and the pump head;
wherein the multifunctional portable tool comprising a first working state in which the driven shaft of the pump head is connected with the first output end of the motor so that the pump head and the motor together function as a pump, and a second working state in which the pump head is driven by the first reset mechanism to move away from the motor until the driven shaft of the pump head is disconnected with the first output end of the motor.

2. The tool of claim 1, wherein the first reset mechanism is a spring, in the first working state, the spring is compressed, and in the second working state, the spring resiliently drives the pump head to move away from the motor until the driven shaft of the pump head is disconnected with the first output end of the motor.

3. The tool of claim 1, further comprising a first connector connected with the first output end of the motor, the first connector having an eccentric hole for receiving the driven shaft of the pump head in the first working state.

4. The tool of claim 3, wherein the first connector comprises an end surface facing the pump head and a slope that extends from the end surface into the eccentric hole, and the driven shaft of the pump head is configured to move from the end surface of the first connector over the slope into the eccentric hole.

5. The tool of claim 1, further comprising an output shaft movably connected with the second connection end of the housing, wherein in the first working state, the output shaft is disconnected with the second output end of the motor, and in the second working state, the output shaft is connected with the second output end of the motor.

6. The tool of claim 5, further comprising a second reset mechanism for disconnecting the output shaft with the second output end of the motor in the first working state.

7. The tool of claim 6, wherein the second reset mechanism is a magnetic reset mechanism.

8. The tool of claim 7, wherein the second reset mechanism comprises an iron sheet fixed with the second connection end of the housing and a magnetic ring fixed with the output shaft, and wherein in the first working state, the iron sheet absorbs and connects the magnetic ring so that the output shaft is disconnected with the second output end of the motor, and in the second working state, the output shaft is driven by an external force to connect with the second output end of the motor so that the magnetic ring is separated from the iron sheet.

9. The tool of claim 5, further comprising a second connector connected with the second output end of the motor, and a third connector connected with the output shaft, wherein in the first working state, the second connector is disconnected with the third connector, and in the second working state, the second connector is connected with the third connector.

10. The tool of claim 9, wherein the second connector has a non-circular outer surface, and the third connector has a non-circular inner surface, the non-circular outer surface and the non-circular inner surface engages with each other in a form fit in the second working state.

11. The tool of claim 5, wherein the tool further comprises a third working state in which the driven shaft of the pump head is disconnected with the first output end of the motor and the output shaft is disconnected with the second output end of the motor, and the second connection end comprises two electrical interfaces electrically connecting with a battery accommodated in the housing.

12. The tool of claim 1, further comprising a clamp mechanism provided at the first connection end of the housing for clamping an outlet pipe that is configured to communicate with an outlet hole of the pump head and drive the pump head under an external force to move towards the motor until the driven shaft of the pump head is connected with the first output end of the motor.

13. The tool of claim 12, wherein the clamp mechanism comprises a fixed portion, a movable button, and a spring connected with the movable button, the fixed portion and the movable button define a through hole for receiving the outlet pipe.

14. The tool of claim 13, wherein the movable button has a slope, and the outlet pipe is configured to move over the slope under the external force into the through hole.

15. The tool of claim 1, wherein the second connection end of the housing has a recessed chamber.

16. The tool of claim 15, wherein the recessed chamber has a female thread on its wall.

17. The tool of claim 15, wherein the second connection end of the housing has two opposing recessed grooves communicating with the recessed chamber and two opposing snaps received within the respective recessed grooves.

18. The tool of claim 1, further comprising a holder received in the housing, the holder comprises a first accommodation portion for accommodating the pump head and the motor, a second accommodation portion for accommodating an inlet pipe that is connected with an inlet hole of the pump head, and a third accommodation portion for accommodating a battery.

19. A personal care apparatus, comprising the multifunctional portable tool of claim 1.

20. The apparatus of claim 19, wherein the apparatus is selected from an electric toothbrush, an electric razor, a nail grinder, a nose hair trimmer, a hand-held fan, a night light, a water flosser, a nasal irrigator, and a portable intelligence toilet.

* * * * *